United States Patent
Akahoshi et al.

(10) Patent No.: US 11,103,954 B2
(45) Date of Patent: Aug. 31, 2021

(54) LASER PROCESSING DEVICE WITH TUBULAR FILTER

(71) Applicant: HONDA MOTOR CO., LTD., Tokyo (JP)

(72) Inventors: Hideaki Akahoshi, Tochigi-ken (JP); Kotaro Fujikura, Tochigi-ken (JP); Kohei Kanaya, Tochigi-ken (JP); Akira Yamaguchi, Tochigi-ken (JP); Akio Shimoda, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 349 days.

(21) Appl. No.: 16/304,743

(22) PCT Filed: May 30, 2017

(86) PCT No.: PCT/JP2017/019987
§ 371 (c)(1),
(2) Date: Nov. 27, 2018

(87) PCT Pub. No.: WO2017/209086
PCT Pub. Date: Dec. 7, 2017

(65) Prior Publication Data
US 2019/0160592 A1    May 30, 2019

(30) Foreign Application Priority Data
May 30, 2016    (JP) .............................. JP2016-106934

(51) Int. Cl.
*B23K 26/142*    (2014.01)
*B23K 26/70*    (2014.01)
(Continued)

(52) U.S. Cl.
CPC ........ *B23K 26/142* (2015.10); *B23K 26/0643* (2013.01); *B23K 26/0648* (2013.01);
(Continued)

(58) Field of Classification Search
CPC ............ B23K 26/1462; B23K 26/1464; B23K 26/1476; B23K 26/142; B23K 26/082;
(Continued)

(56) References Cited

U.S. PATENT DOCUMENTS 4,642,445 A * 2/1987 Stol ........................ B23K 26/12
219/121.84
5,148,446 A * 9/1992 Radich ............... B23K 26/1476
359/511
(Continued)

FOREIGN PATENT DOCUMENTS

DE    102006047794    4/2008
JP    01-107994    4/1989
(Continued)

OTHER PUBLICATIONS

Machine English Translation of JP2002361467A (Year: 2002).*
(Continued)

*Primary Examiner* — Tu B Hoang
*Assistant Examiner* — Erwin J Wunderlich
(74) *Attorney, Agent, or Firm* — Amin, Turocy & Watson, LLP (57) ABSTRACT

The present invention is a laser processing device wherein adhesion of fumes to a lens can be effectively avoided. The laser processing device is provided with a laser scanner provided with protective glass on a laser output opening, and a cylindrical member having a through path through which the laser output via the protective glass passes formed on the center side in the direction of the radius. A cylindrically shaped filter is disposed on an inside wall part of the cylindrical member facing the through path. The cylindrical member discharges a gas into the through path from the filter.

5 Claims, 5 Drawing Sheets (51) Int. Cl.
*B23K 26/14* (2014.01)
*B23K 26/244* (2014.01)
*B23K 26/382* (2014.01)
*B23K 26/38* (2014.01)
*B23K 26/26* (2014.01)
*B23K 26/082* (2014.01)
*B23K 26/06* (2014.01)
*B23K 26/12* (2014.01)
*B23K 26/28* (2014.01)
*B23K 101/04* (2006.01)

(52) U.S. Cl.
CPC .......... *B23K 26/082* (2015.10); *B23K 26/127* (2013.01); *B23K 26/1476* (2013.01); *B23K 26/244* (2015.10); *B23K 26/26* (2013.01); *B23K 26/28* (2013.01); *B23K 26/38* (2013.01); *B23K 26/382* (2015.10); *B23K 26/706* (2015.10); *B23K 26/1462* (2015.10); *B23K 26/1464* (2013.01); *B23K 2101/045* (2018.08)

(58) Field of Classification Search
CPC .. B23K 26/244; B23K 26/382; B23K 26/706; B23K 26/0643; B23K 26/0648; B23K 26/127; B23K 26/26; B23K 26/28; B23K 26/38; B23K 2101/045
See application file for complete search history.

(56) References Cited

U.S. PATENT DOCUMENTS

| | | | | |
|---|---|---|---|---|
| 5,756,962 A | * | 5/1998 | James | B23K 26/0665 219/121.75 |
| 5,876,767 A | * | 3/1999 | Mattes | B29C 64/153 425/174.4 |
| 7,605,345 B2 | * | 10/2009 | Fukuda | B23K 26/147 219/121.84 |
| 7,636,537 B2 | * | 12/2009 | Sano | G03G 15/0855 399/258 |
| 2016/0144455 A1 | * | 5/2016 | Yanaka | B23K 26/34 219/76.1 |

FOREIGN PATENT DOCUMENTS

| | | | |
|---|---|---|---|
| JP | 2002361467 A | * 12/2002 | |
| JP | 2014-237148 | 12/2014 | |
| WO | WO-2013137289 A1 | * 9/2013 | ........... B23K 26/703 |

OTHER PUBLICATIONS

Machine English Translation of WO2013137289A1 (Year: 2013).*
International Search Report and Written Opinion for International Application No. PCT/JP2017/019987 dated Jul. 11, 2017, 9 pages.

* cited by examiner

LASER PROCESSING DEVICE WITH TUBULAR FILTER

TECHNICAL FIELD

This invention relates to a laser processing device with a tubular member being interposed between a lens, which is provided at an output opening for a laser beam, and an article to be machined.

BACKGROUND ART

In a laser processing device for performing laser welding, laser cutting, and so forth, it is necessary to prevent spatters and fumes which are generated from a workpiece irradiated with a laser beam, from adhering to a lens provided at a laser output opening. The lens here is a generic name for a condensing lens, a protective glass which protects optics, and so forth.

In Japanese Laid-Open Patent Publication No. 01-107994, for example, a laser processing device with a substantially tubular cross-jet gas injection unit interposed between a lens and an article to be machined is proposed.

Specifically, the cross-jet gas injection unit has formed therein a through path through which a laser beam passes, and a discharge pipe that discharges cross-jet gas in a direction intersecting a direction in which the laser beam travels and a suction pipe that draws the cross-jet gas thereinto are connected to the cross-jet gas injection unit. By flowing the cross-jet gas in this manner, it is possible to keep spatters and fumes from reaching the lens through the through path, whereby adherence of the spatters and fumes to the lens is avoided.

SUMMARY OF INVENTION

The flow velocity of the cross-jet gas flowing near the discharge pipe and the suction pipe is, as a matter of course, higher than that of ambient air. Due to such a flow velocity difference between the cross-jet gas and ambient air, ambient air is caught up therein, which sometimes causes a secondary air current toward the lens in the through path.

In this case, there is fear that the spatters and fumes carried by the above-described air current traverse the flow of the cross-jet gas and move to the lens side in the through path, resulting in adherence of the spatters and fumes to the lens. In particular, since the fumes are formed of metallic vapors thermally rising from a workpiece melted at high temperatures due to laser irradiation, and the density thereof is low, the fumes easily move by being carried by the above-described air current. Thus, even with the circulated cross-jet gas, it is difficult to suitably avoid the adherence of the fumes to the lens.

A main object of the present invention is to provide a laser processing device that can effectively avoid adherence of fumes to a lens.

An aspect of the present invention provides a laser processing device including: a laser scanner having a lens provided in an output opening for a laser beam; and a tubular member having a through path, through which the laser beam output through the lens passes, the through path being formed on the center side in a radial direction thereof. In an inner wall portion, which faces the through path, of the tubular member, a tubular filter is provided, and the tubular member discharges gas from the filter into the through path, the through path has a cylindrical shape whose diameter is constant in an axial direction thereof, an inner surface of the filter occupies 50% or more of an inner surface of the inner wall portion, and a cross-jet gas injection unit configured to inject a cross-jet gas in a direction intersecting a traveling direction of the laser beam is provided between an irradiation target for the laser beam and the tubular member.

In the laser processing device according to the present invention, in the output opening for the laser beam, a condenser lens that condenses the laser beam, a protective glass that protects optics, and so forth, are provided as the lens. The laser beam output from the laser scanner through this lens passes through the through path formed on the radially center side of the tubular filter, which is provided in the inner wall portion of the tubular member, and is shone onto an article to be processed. That is, the tubular member and the filter are provided between the article to be processed and the lens such that the laser beam passes through the through path.

The tubular member discharges gas into the through path through the filter in a manner that the gas passes through the filter from an outer surface side of the filter located on the radially outward side, which is an upstream side, toward an inner surface side thereof located on the radially center side, which is a downstream side. The velocity difference of the gas is evened out by resistance or the like caused when the gas passes through the filter. Owing to this, the gas having a reduced velocity difference between locations is discharged into the through path. As a result, between the article to be processed and the lens, a high-pressure layer in which, although the pressure thereof is higher than that of the outside air, the occurrence of a turbulent flow is prevented, is formed. Even when such a high-pressure layer is formed in the through path, an air current that draws in fumes toward the lens beyond the high-pressure layer is not generated. Moreover, it is possible to generate a gentle flow of the gas directed from the high-pressure layer toward the article to be processed.

Therefore, with this laser processing device, since the above-described high-pressure layer can be formed between the article to be processed and the lens, it is possible to prevent fumes, which are generated from the article to be processed, from moving across the high-pressure layer toward the lens. This makes it possible to effectively avoid the adherence of the fumes to the lens.

In the above-described laser processing device, it is preferable that the filter is a sintered metallic filter comprising a sintered body made of powder of copper. Such a filter can be stably used because the filter itself can be prevented from being deteriorated even when spatters or the like come into contact therewith. That is, by using the sintered metallic filter, it is possible to improve the durability of the laser processing device and achieve easy maintenance, for example.

In the above-described laser processing device, it is preferable that the filter has a cylindrical shape whose diameter is constant in an axial direction thereof. In this case, the filter can be formed into a simple shape, which makes it possible to reduce the production cost of the filter and reduce the production cost of the laser processing device accordingly. Moreover, since the diameter of the filter is constant in an axial direction, it is possible to effectively prevent variation in velocity of the gas, which is discharged into the through path through the filter, from occurring in the axial direction. This makes it possible to form the high-pressure layer satisfactorily and avoid the adherence of the fumes to the lens.

In the above-described laser processing device, it is preferable that the filter is supplied with the gas via a chamber formed between the filter and an inner surface of an outer wall portion of the tubular member, and the gas is supplied to the chamber from a gas supply pipe in a manner that an inflow direction of the gas is oriented along at least part of an outer surface of the filter. In this case, the gas is supplied to the chamber so as to increase the internal pressure thereof while avoiding a situation in which the direction of inflow of the gas is perpendicular to the outer surface of the filter. Owing thereto, the pressure difference of the gas is evened out in the chamber, and then the gas is substantially evenly supplied to the whole of the filter. As a result, it is possible to form the high-pressure layer by more effectively preventing variation in velocity of the gas, which is discharged into the through path through the filter, and thus it is possible to avoid the adherence of the fumes to the lens.

DESCRIPTION OF EMBODIMENTS

Preferred embodiments of a laser processing device according to the present invention will be described in detail with reference to the accompanying drawings.

Figure 1:
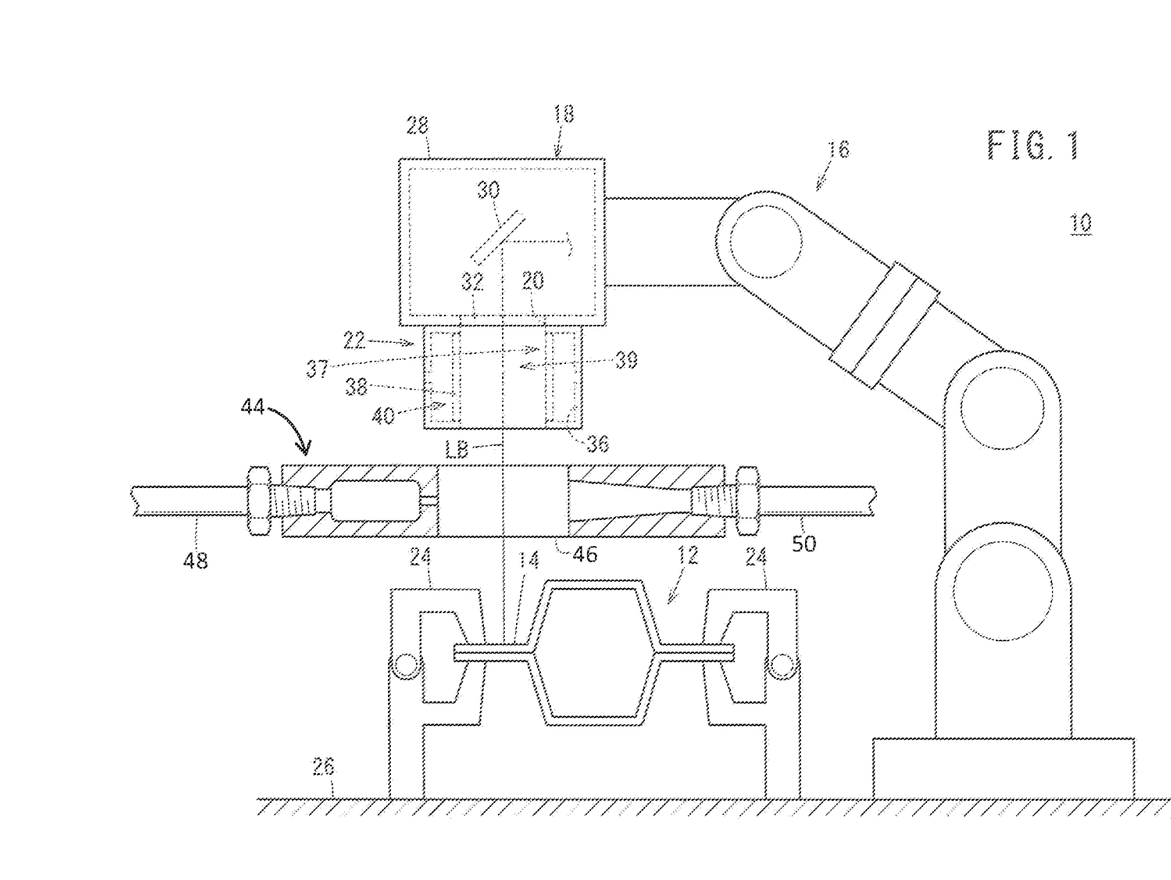
FIG. 1 is a schematic overall side view of a laser processing device according to the present invention.

The laser processing device according to the present invention can be suitably used in a case where welding, cutting, boring, or the like is performed on an article to be processed, by irradiating the same with a laser beam. In the present embodiment, as depicted in FIG. 1, an example in which a laser processing device 10 welds flanges 14 of a set of workpieces 12 serving as an article to be processed, in a state where the flanges are placed in contact with each other, will be described. However, the embodiment is not particularly limited to this example.

The laser processing device 10 mainly includes, for example, a laser scanner 18 that is supported at the tip of an articulated robot 16, and a tubular member 22 that is detachably attached to a laser output opening 20, which will be described later, of the laser scanner 18. As the articulated robot 16, it is possible to use a publicly known articulated robot, for example, that can move the laser scanner 18 along the flanges 14 of the workpieces 12 supported on a workbench 26 by clampers 24 and move the laser scanner 18 closer to or away from the workpieces 12.

Thus, explanation of the specific configuration of the articulated robot 16 will be omitted.

The laser scanner 18 has a scanner main body 28 optically connected to a laser oscillator (which is not depicted in the drawing), and, in the scanner main body 28, optical members such as a mirror 30, a condenser lens (which is not depicted in the drawing), and the like are housed. Moreover, the laser output opening 20 is provided in the scanner main body 28 as an opening for outputting a laser beam LB that is emitted from the laser oscillator and then deflected by the optical members, and a protective glass 32 (a lens) is detachably attached so as to cover the laser output opening 20. That is, the laser scanner 18 outputs the laser beam LB from the laser output opening 20 through the protective glass 32.

Figure 2:
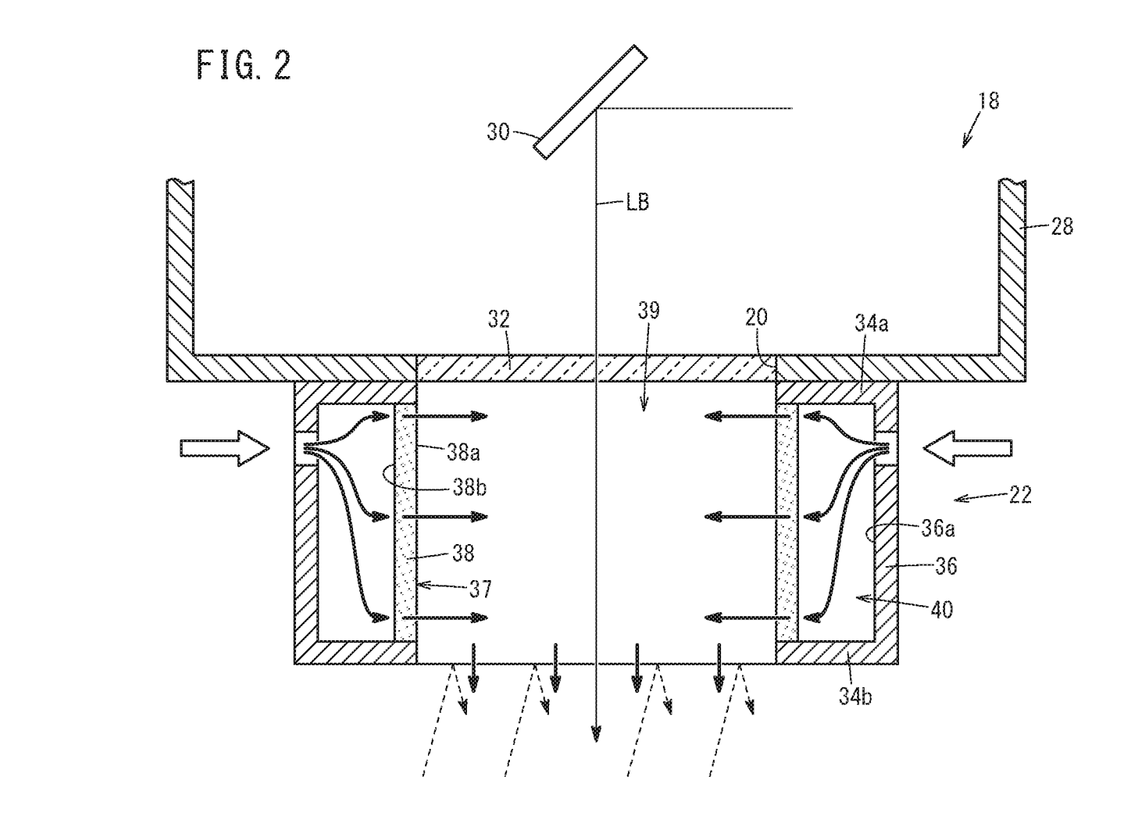
FIG. 2 is a sectional view of main portions of the laser processing device of FIG. 1.

As depicted in FIG. 2, the tubular member 22 has ring-shaped end face portions (a base end face portion 34a and a front end face portion 34b), each having an inside diameter which is substantially equal to or greater than the size of the laser output opening 20, and a tubular outer wall portion 36 whose diameter is substantially equal to the outside diameter of the end face portions 34a and 34b. It is preferable that the end face portions 34a, 34b and the outer wall portion 36 are integrally formed of a relatively lightweight material such as aluminum.

In the tubular member 22, a tubular inner wall portion 37 whose inside diameter is substantially equal to the inside diameter of the end face portions 34a, 34b and whose diameter is smaller than the outside diameter of the end face portions 34a, 34b, for example, is provided so as to be substantially coaxial with the outer wall portion 36. In the entire perimeter of this inner wall portion 37, a tubular filter 38 is provided. It is preferable that an inner surface 38a of the filter 38 occupies 50% or more of the inner surface of the inner wall portion 37. Moreover, it is preferable that an outer surface 38b of the filter 38 occupies 50% or more of the outer surface of the inner wall portion 37. The reason therefor will be described later.

The tubular member 22 is attached near the laser output opening 20 of the laser scanner 18 so that a through path 39, through which the laser beam LB output from the laser output opening 20 passes, is formed on the center side of the filter 38 in a radial direction. The inside diameter of the filter 38 is not limited to the above-described size and only has to be a size that allows the laser beam LB to pass through the through path 39 without being interrupted by the filter 38.

Figure 3:
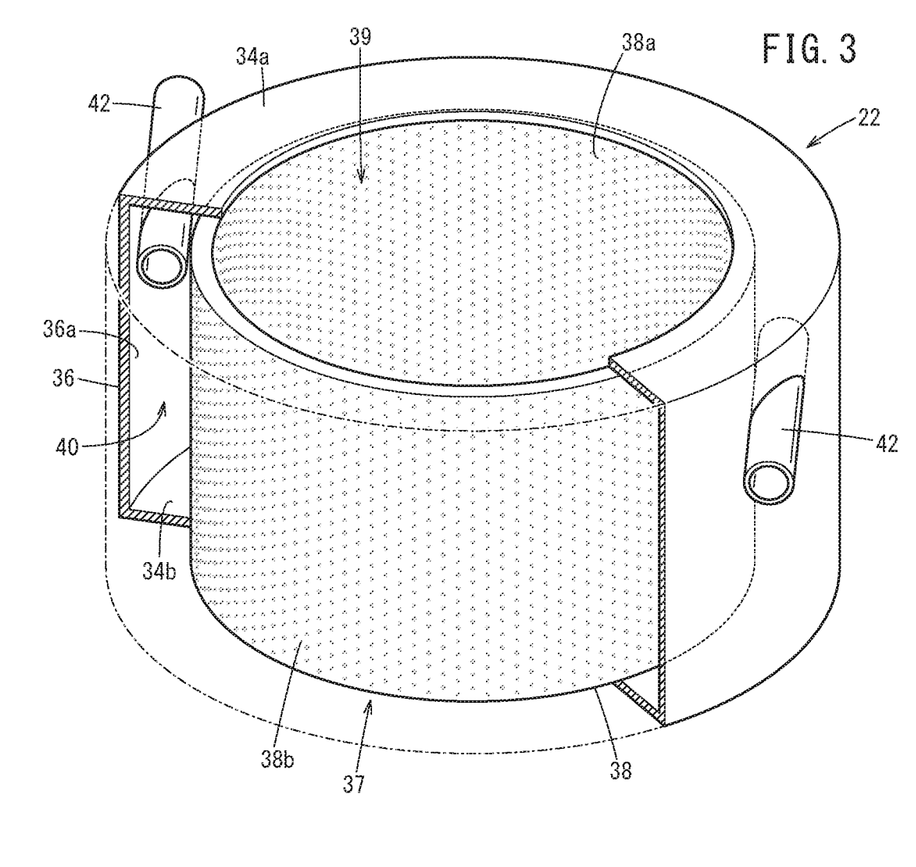
FIG. 3 is a schematic perspective view of a tubular member of the laser processing device of FIG. 1.
Figure 4:
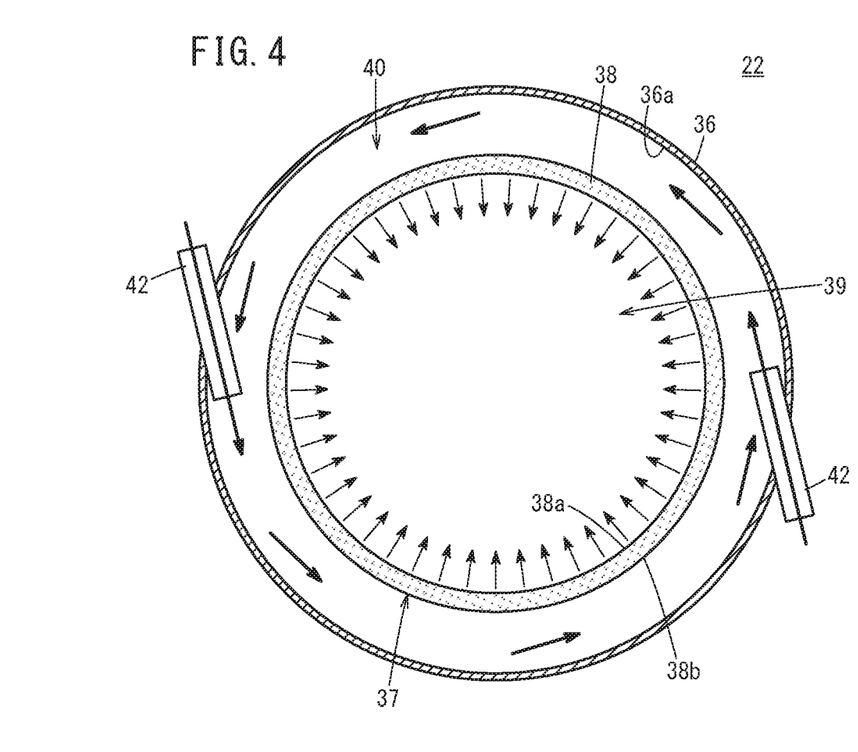
FIG. 4 is a schematic plan view of the tubular member of FIG. 3.

Moreover, a chamber 40 is formed between an inner surface 36a of the outer wall portion 36 and the outer surface 38b of the filter 38 facing the inner surface 36a. That is, the chamber 40 is defined by the outer wall portion 36, the inner wall portion 37, and the end face portions 34a and 34b. As depicted in FIGS. 3 and 4, gas is supplied from a gas supply source (which is not depicted in the drawing) to this chamber 40 via a gas supply pipe 42 connected to the outer wall portion 36. For the purpose of illustration, in FIGS. 1 and 2, the gas supply pipe 42 is not depicted in the drawings. In this case, it is preferable that a direction in which the gas supply pipe 42 extends into the chamber 40 is adjusted so that an inflow direction of the gas in which the gas is supplied to the chamber 40 is oriented along at least part of the outer surface 38b of the filter 38, in other words, the inflow direction is not perpendicular to the outer surface 38b. The reason therefor will be described later.

In the present embodiment, as depicted in FIGS. 3 and 4, two gas supply pipes 42 are connected to the outer wall portion 36 of the tubular member 22, and a direction in which each gas supply pipe 42 extends is adjusted so as to be inclined with respect to the radial direction of the filter 38. Moreover, the relationship between the directions in which the gas supply pipes 42 extend is set so that the gas supplied by one of the two gas supply pipes 42 and the gas supplied by the other flow in the same direction along the circumferential direction of the chamber 40 as indicated by arrows in FIG. 4.

As the type of gas, for example, plant air or the like can be suitably used because the plant air can be easily supplied by using a simple configuration; however, the type of gas is not particularly limited thereto. Any gas can be used, and gas can be selected from among various gases in accordance with the material of the workpieces 12, the use of the laser processing device 10, and so forth.

The filter 38 is supplied with the gas via the chamber 40 from the outer surface 38b side. In this configuration, gas passes through the filter 38 from the outer surface 38b side being an upstream side toward the inner surface 38a side being a downstream side, and the gas is then discharged into the through path 39. The material, thickness, pore size, and so forth, of the filter 38 may be optionally set as long as, when gas is discharged through the filter 38 into the through path 39, the filter 38 allows the gas to flow uniformly by evening out the velocity difference between locations due to resistance or the like caused when the gas passes through the filter 38.

Examples of the material of such a filter 38 include sintered metal, ceramics, and resin; however, sintered metal is preferable from the following viewpoint. That is, the filter 38 (a sintered metallic filter) formed of sintered metal is a porous body which is obtained by sintering metal powder of copper, stainless steel, or the like. Such a filter 38 can be stably used because the filter 38 itself can be prevented from being deteriorated even when spatters or the like come into contact therewith. Therefore, by using the filter 38 formed of sintered metal, it is possible to improve the durability of the laser processing device 10 and achieve easy maintenance, for example.

Moreover, the shape of the filter 38 is not limited to a particular shape as long as the shape is tubular; however, it is preferable that the filter 38 has a cylindrical shape whose diameter is constant in an axial direction. In this case, the filter 38 can be formed into a simple shape, which makes it possible to reduce the production cost of the filter 38 and reduce the production cost of the laser processing device 10 accordingly. Furthermore, since the diameter of the filter 38 is constant in an axial direction, it is possible to effectively prevent variation in velocity of the gas, which is discharged into the through path 39 through the filter 38, from occurring in the axial direction.

In addition, concerning the filter 38, it is desirable to choose a filter having the finest possible degree of filtration accuracy in order to achieve a laminar flow by decreasing the Reynolds number by reducing a discharge speed; in the present embodiment, a filter having the filtration accuracy of approximately 5 μm is used.

The laser processing device 10 may include a cross-jet gas injection unit 44 comprising a cylindrical main body 46 and as described in Japanese Laid-Open Patent Publication No. 01-107994 mentioned above, for example, between the workpieces 12 and the tubular member 22. In this case, the laser beam LB that has passed through the through path 39 of the filter 38 further passes through the inside of cross-jet gas, and the workpieces 12 is irradiated with the laser beam LB. That is, by a discharge pipe 48 and a suction pipe 50 which are connected to the cross-jet gas injection unit 44, the cross-jet gas is injected in a direction intersecting a direction in which the laser beam LB travels.

The laser processing device 10 according to the present embodiment is basically constructed as described above; next, the workings and effects thereof will be described in connection with an operation of performing laser welding by using the laser processing device 10. In the following description, a case where the laser processing device 10 includes the cross-jet gas injection unit 44 will be described.

In laser welding using the laser processing device 10, as depicted in FIG. 1, first, the laser scanner 18 is moved by the articulated robot 16, and the laser output opening 20 is disposed so that the laser beam LB can be shone onto a welded portion of the workpieces 12.

Next, the laser beam LB is emitted from the above-described laser oscillator in a state in which the gas is supplied to the chamber 40 of the tubular member 22 from the above-described gas supply source via the gas supply pipes 42 and the cross-jet gas is made to flow between the discharge pipe and the suction pipe of the above-described cross-jet gas injection unit.

In the tubular member 22, as a result of the directions in which the gas supply pipes 42 extend being adjusted in the above-described manner, as depicted in FIGS. 2 and 4, the gas is supplied to the chamber 40 while avoiding a situation where the gas inflow direction is perpendicular to the outer surface 38b of the filter 38, in other words, while avoiding a situation where the gas is perpendicularly injected to the filter 38. This evens out a pressure difference in the chamber 40 and thereby causes the gas to be substantially evenly supplied to the whole of the filter 38. As a result, it is possible to effectively prevent variation in velocity of the gas, which is discharged to the through path 39 through the filter 38, and it is possible to satisfactorily form, in the through path 39, a high-pressure layer in which, although the pressure thereof is higher than that of the outside air, the occurrence of a turbulent flow is prevented. As depicted in FIG. 2, a gentle flow of the gas directed toward the workpieces 12 can be generated from this high-pressure layer.

In this way, when the tubular member 22 discharges the gas into the through path 39 through the filter 38, the outer surface 38b of the filter 38 serves as a gas suction surface and the inner surface 38a serves as a gas discharge surface. Thus, by making the outer surface 38b of the filter 38 occupy 50% or more of the outer surface of the inner wall portion 37 as described above, the gas can be taken in from a wide area of the inner wall portion 37.

Moreover, by making the inner surface 38a of the filter 38 occupy 50% or more of the inner surface of the inner wall portion 37, the gas whose flow velocity has been decreased can be discharged from a wide area in high volume. As a result, it is possible to fill the through path 39 with the gas whose pressure is slightly higher than that of ambient air, which makes it possible to prevent ambient air from being caught up therein, and more satisfactorily form the high-pressure layer in which the occurrence of a turbulent flow is prevented.

Furthermore, the laser scanner 18 outputs, from the laser output opening 20 through the protective glass 32, the laser beam LB guided from the laser oscillator to the optical members in the scanner main body 28. After passing through the through path 39 of the filter 38 provided in the tubular member 22, the laser beam LB passes through the above-described cross-jet gas and is shone onto the welded portion of the workpieces 12.

In this way, by moving the scanner main body 28 along the welded portion by the articulated robot 16 while welding the spot of the workpieces 12 irradiated with the laser beam LB, it is possible to perform laser welding on the entire welded portion of the workpieces 12. At the time of this laser welding, first, the cross-jet gas keeps spatters and fumes generated from the workpieces 12 from moving toward the protective glass 32. In particular, the movement of the spatters, whose density is higher than that of the fumes, can be effectively avoided by the cross-jet gas.

Moreover, even when a secondary air current is generated by flow of the cross-jet gas whose flow velocity greatly differs from that of ambient air and the fumes are caught up in the air current, the movement of the fumes toward the protective glass 32 of the through path 39 can be effectively prevented. The reason is as follows: the above-described high-pressure layer is formed between the cross-jet gas injection unit and the protective glass 32, which makes it possible to avoid the fumes from passing through the high-pressure layer.

That is, even when the high-pressure layer, in which the occurrence of a turbulent flow is prevented, is formed in the through path 39 as described above, a secondary air current that draws the fumes into the high-pressure layer toward the protective glass 32 is not generated. Moreover, as depicted in FIG. 2, it is possible to guide the fumes to a side remote from the protective glass 32 by a gentle flow of the gas directed toward the workpieces 12 from the high-pressure layer. In FIG. 2, the flow of the gas is indicated by solid arrows and the flow of an air current containing the fumes is indicated by dashed arrows.

As described above, with this laser processing device 10, it is possible to effectively avoid the adherence of spatters and fumes, which are generated from the workpieces 12 at the time of laser welding, to the protective glass 32.

The present invention is not particularly limited to the above-described embodiment, and various modifications are possible within the scope of the present invention.

In the laser processing device 10 according to the above-described embodiment, the two gas supply pipes 42 are connected to the outer wall portion 36 of the tubular member 22, and a direction in which each gas supply pipe 42 extends is adjusted so as to be inclined with respect to the radial direction of the filter 38. However, the number of gas supply pipes 42 is not limited to two, and the number of gas supply pipes 42 may be one, or three or more.

Figure 5:
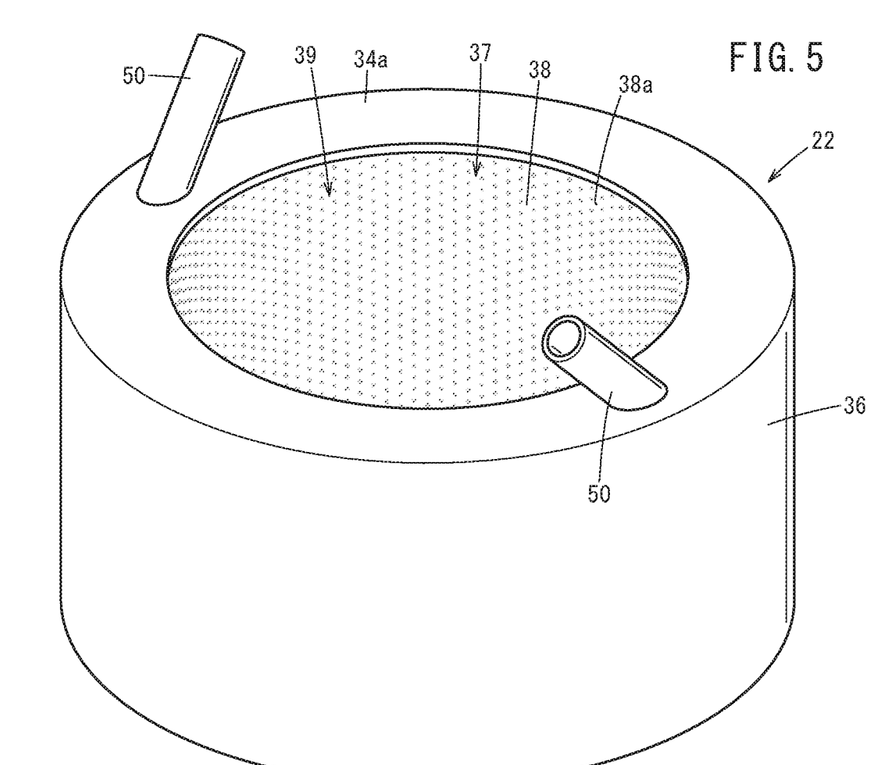
FIG. 5 is a schematic perspective view of a tubular member of a laser processing device according to another embodiment of the present invention.

Moreover, the gas supply pipes 42 may be connected to both or one of the end face portions 34a and 34b, in place of the outer wall portion 36 of the tubular member 22. For instance, FIG. 5 shows a perspective view of the tubular member 22 with two gas supply pipes 50 being connected to the base end face portion 34a. Of constituent elements in FIG. 5, constituent elements that have functions and effects which are the same as or similar to those of the constituent elements depicted in FIGS. 1 to 4 will be denoted by the same reference characters, and detailed explanations thereof will be omitted.

In this case, as depicted in FIG. 5, it is preferable that a direction in which each gas supply pipe 50 extends is inclined with respect to the axial direction of the tubular member 22. Moreover, it is preferable that the relationship between the directions in which the gas supply pipes 50 extend is set so that the gas supplied by one of the two gas supply pipes 50 and the gas supplied by the other flow in the same direction along the circumferential direction of the chamber 40. By doing so, it is possible to supply, to the filter 38, the gas whose velocity distribution is made satisfactorily uniform in the chamber 40, with the inflow direction of the gas to the chamber 40 being oriented along at least part of the outer surface 38b of the filter 38. Therefore, it is possible to satisfactorily form a high-pressure layer, in which the occurrence of a turbulent flow is prevented, by effectively preventing variation in velocity of the gas discharged into the through path 39 through the filter 38, whereby it is possible to effectively prevent fumes from adhering to the protective glass 32.

Moreover, in the laser processing device 10 according to the above-described embodiment, the chamber 40 is formed between the inner surface 36a of the outer wall portion 36 of the tubular member 22 and the outer surface 38b of the filter 38 and the gas is supplied to the filter 38 via the chamber 40. However, if the above-described high-pressure layer can be formed in the through path 39, the gas may be supplied to the filter 38 without passing through the chamber 40.

Furthermore, in the laser processing device 10 according to the above-described embodiment, the tubular member 22 is detachably attached near the laser output opening 20 of the laser scanner 18 with the protective glass 32. However, the tubular member 22 may be detachably attached near the laser output opening 20 of the laser scanner 18 with no protective glass 32. In this case, it is possible to effectively prevent fumes and spatters from adhering to a condenser lens or the like.

What is claim is:

1. A laser processing device comprising:
   a laser scanner having a lens provided in an output opening for a laser beam; and
   a tubular member having a through path, through which the laser beam output through the lens passes, the through path being formed on a center side in a radial direction thereof, wherein
   in an inner wall portion of the tubular member, which faces the through path, of the tubular member, a tubular filter is provided,
   the tubular member discharges gas from the filter toward a center side in the radial direction of the through path,
   the through path has a cylindrical shape whose diameter is constant in an axial direction thereof,
   an inner surface of the filter occupies 50% or more of an inner surface of the inner wall portion,
   the laser processing device further comprises a cross-jet gas injection unit, and
   the cross-jet gas injection unit includes
      a cylindrical main body that is placed between a laser irradiation target and the tubular member and is provided with a passing path through which the laser beam passes,
      a discharge tube that is connected to the main body and discharges cross-jet gas in a direction intersecting a direction in which the laser beam travels through the passing path, and
      a suction pipe that is connected to the main body and draws the cross-jet gas,
   wherein the gas is supplied to a chamber formed between the filter and an inner surface of an outer wall portion of the tubular member from a gas supply pipe inclined with respect to a radial direction of the filter in a manner that an inflow direction of the gas is oriented along at least part of an outer surface of the filter and the gas flows in a circumferential direction with respect to the chamber.

2. The laser processing device according to claim 1, wherein
   the filter is a sintered metallic filter comprising a sintered body made of copper powder.

3. The laser processing device according to claim 1, wherein
   the filter has a cylindrical shape whose diameter is constant in an axial direction of the cylindrical shape.

4. The laser processing device according to claim 1, wherein
   the filter is supplied with the gas via the chamber.

5. The laser processing device according to claim 1, wherein
   the tubular member is made of aluminum.

* * * * *